United States Patent
Moon et al.

(10) Patent No.: US 6,195,483 B1
(45) Date of Patent: *Feb. 27, 2001

(54) FIBER BRAGG GRATINGS IN CHALCOGENIDE OR CHALCOHALIDE BASED INFRARED OPTICAL FIBERS

(75) Inventors: John A. Moon, Alexandria; Lynda E. Busse, Lorton, both of VA (US); Jasbinder S. Sanghera, Greenbelt, MD (US); Iswar D. Aggarwal, Fairfax Station, VA (US)

(73) Assignee: The United States of America as represented by the Secretary of the Navy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,846

(22) Filed: Sep. 30, 1996

(51) Int. Cl.[7] .................................................. G02B 6/16
(52) U.S. Cl. ............................. 385/37; 385/49; 385/50; 65/441; 359/566
(58) Field of Search ............................... 385/37, 49, 50; 65/441; 359/566

(56) References Cited

U.S. PATENT DOCUMENTS

| | | | |
|---|---|---|---|
| 4,993,812 | * | 2/1991 | Matsuoka et al. .................. 350/394 |
| 5,066,133 | * | 11/1991 | Brienza ................................ 385/37 |
| 5,136,677 | * | 8/1992 | Drexhage et al. ................. 385/123 |
| 5,218,651 | * | 6/1993 | Faco et al. ........................... 385/37 |
| 5,309,452 | * | 5/1994 | Ohishi et al. .......................... 372/6 |
| 5,364,434 | * | 11/1994 | Sanghera et al. .................. 65/30.1 |
| 5,388,173 | * | 2/1995 | Glenn .................................. 385/37 |
| 5,400,422 | * | 3/1995 | Askins et al. ....................... 385/37 |
| 5,559,907 | * | 9/1996 | Inniss et al. ........................ 385/11 |
| 5,627,927 | * | 5/1997 | Udd ..................................... 385/37 |
| 5,629,953 | * | 5/1997 | Bishop et al. ...................... 372/39 |
| 5,636,304 | * | 6/1997 | Mizrahi et al. .................... 385/37 |

* cited by examiner

Primary Examiner—Rodney Bovernick
Assistant Examiner—Ellen E. Kim
(74) Attorney, Agent, or Firm—John J. Karasek; Sally A. Ferrett

(57) ABSTRACT

A reflective Bragg grating in the interior of an infrared transmitting glass fiber, and a method for fabricating such reflective Bragg grating in the interior of the infrared transmitting glass fiber is disclosed. The method comprises the steps of: producing first and second writing beams at the same wavelength; orienting the first and second writing beams in parallel with respect to each other; crossing the first and second writing beams at a preselected angle with respect to each other to form an interference pattern at the intersection of the first and second writing beams; positioning the infrared transmitting glass fiber at the intersection of the first and second writing beams so that the interference pattern occurs along a portion of the length of the infrared transmitting glass fiber; and maintaining the infrared transmitting glass fiber at the intersection of the first and second writing beams for a time sufficient to produce a Bragg grating in the core and cladding of the infrared transmitting glass fiber.

17 Claims, 3 Drawing Sheets

FIBER BRAGG GRATINGS IN CHALCOGENIDE OR CHALCOHALIDE BASED INFRARED OPTICAL FIBERS

BACKGROUND OF THE INVENTION

1. Field of the Invention

The present invention relates to fiber Bragg gratings and more particularly to a method of writing fiber Bragg gratings in infrared transmitting chalcogenide-based or chalcohalide-based fibers.

2. Description of Related Art

Since the discovery and description of photodarkening in chalcogenide glasses in 1971 by Berkes et al. ("Photodecomposition of Amorphous $As_2Se_3$ and $As_2S_3$", *J. Appl. Phys.* Vol. 42, No. 12, pp. 4908–4916, November 1971), much effort has been put forth to understand the detailed mechanisms of this effect. Sulfide based chalcogenide glass, specifically arsenic sulfide ($As_2S_3$), exhibits a wealth of interesting permanent and reversible photoinduced changes when illuminated with light that has an energy near the Tauc gap of 2.3 eV. These changes include photodarkening, and photoinduced birefringence and dichroism. Photodarkening is discussed in "Mechanisms of Photodarkening in Amorphous Chalcogenides", K. Tanaka, *Journal of Non-Crystalline Solids,* Vol. 59–60, Part II, pp 925–928, (1983). Photoinduced birefringence and dichroism are discussed at greater length in "Photoinduced Optical Anisotropy in Chalcogenide Vitreous Semiconducting Films", V. G. Zhdanov et al., *Physica Status Solidi (a),* Vol.52, No. 1, pp 621–626, (March 1979) and in "Anisotropy of Photoinduced Light-Scattering in Glassy $As_2S_3$", V. Lyubin et al., *Journal of Non-Crystalline Solids,* Vols. 164–166, pp 1165–1168, North-Holland (1993).

Although a unified theoretical microscopic description of these effects is not complete, it is believed that photodarkening is produced as carriers break As—S bonds when they recombine, causing an increase in As—As and S—S bonding, which in turn causes a lowering of the band-gap energy by as much as 0.05 eV at room temperature. (See "The Origin of Photo-Induced Optical Anisotrophies in Chalcogenide Glasses", H. Fritzsche, *Journal of Non-Crystalline Solids,* Vols. 164–166, pp. 1169–1172, North-Holland, 1993.) Since only a finite number of As—S bonds have a local environment which allows this process to happen, the effect saturates with total illumination energy. Regardless of the model, however, these effects are experimentally well characterized: the total refractive index change at 600 nm is about 0.01. (See "Photodarkening Profiles and Kinetics in Chalcogenide Glasses", S. Ducharme et al., *Physical Review B,* Vol. 41, No.17, pp. 12 250–12 259, Jun. 15, 1990.) A simple Kramers-Kronig analysis predicts that this index change will decrease linearly with photon energy in the transparent region of the glass, thus allowing large amplitudes ($\Delta n \sim 10^{-3}$) to be induced in the infrared.

The technique of side writing fiber Bragg gratings in germanium-doped silica fibers is well established and was first described by Meltz, et al. ("Formation of Bragg Gratings in Optical Fibers By A Transverse Holographic Method", *Optics Letters,* Vol. 14, No. 15, pp 823–825, August 1989.) Two "writing" beams are crossed at some angle $\theta$, with the intersection point coinciding with the core of the silica fiber. The crossed beams form an intensity grating along the axis of the fiber with period $\Lambda = \lambda_W/(2 \sin \theta)$, where $\lambda_W$ is the wavelength and $\theta$ is the half-angle between the writing beams, respectively. The writing beams change an absorption line due to the germanium doping of the core, causing a change $\Delta n$ in the index of refraction n at lower photon energies. The index change amplitude is around $\Delta n \sim 10^{-5}$–$10^{-6}$ for silica glass. This grating forms a Bragg reflector at the vacuum wavelength $\lambda_B$ for light launched down the core of the fiber at $\lambda_B = 2n\Lambda$. The "photonic band gap" energy, $\Delta v_B$, which corresponds to the full-width of the reflectance between the first two zeros of the reflectivity, is $\Delta v_B/v_B = \Delta n/n$ where $V_B = c/\lambda_B$ and c is the speed of light. See "Propagation Through Nonuniform Grating Structures", J. E. Sipe et al., *J. Opt. Soc. Am. A,* Vol. 11, No. 4, pp. 1307–1320 (April 1994).

It has been previously demonstrated by Shiramine et al. ("Photoinduced Bragg Reflector In $As_2S_3$ Glass", *Appl. Phys. Lett.,* Vol. 64 (14), pp 1771–1773, Apr. 4, 1994) that Hill gratings may be written in $As_2S_3$ glass flakes. Hill gratings are formed from absorption of the peaks of the standing wave produced by multiple reflections from parallel end-surfaces. (See "Photosensitivity In Optical Fiber Waveguides: Application To Reflection Filter Fabrication", K. C. Hill et al., *Appl. Phys. Lett.,* Vol. 32 (10), pp. 647–649, May 15, 1978.) The period of the standing wave sets the Bragg reflection condition, which gives a reflection maximum at the wavelength of the writing beam. Since the energy of the writing beam needs to be near the Tauc gap in order to photoinduce carriers, Hill gratings will not be useful at infrared wavelengths which are not significantly absorbed in the material.

SUMMARY OF THE INVENTION

It is therefore an object of the invention to provide variable-bandwidth, high reflectance fiber Bragg gratings for mid-infrared integrated optics applications.

Another object of the invention is to write reflective Bragg gratings into infrared transmitting fibers.

Another object of the invention is to side write fiber Bragg gratings into infrared transmitting fibers.

Another object of the invention is to provide fiber Bragg gratings in chalcogenide or chalcohalide-based infrared optical fibers with reflectances peaked at one or more wavelengths between 1.5 and 15 microns in the infrared.

A further object of the invention is to side write highly-reflective, fiber Bragg gratings into sulfide-based chalcogenide infrared optical fibers.

A further object of the invention is to provide fiber Bragg gratings in infrared transmitting sulfide-based fibers.

These and other objects of this invention are achieved by forming reflective fiber Bragg gratings in the interior of an infrared transmitting glass fiber, such as a chalcogenide or chalcohalide-based infrared optical fiber, by side illuminating the fiber with two same-wavelength, laser writing beams which intersect at some angle in the fiber to form an intensity grating by way of interference along the length of the fiber, maintaining the infrared transmitting glass fiber at the intersection of the two writing beams to produce a reflective Bragg grating in the core and cladding of the glass fiber, and repeating this operation for each reflective fiber Bragg grating that is desired.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Before explaining the structure and operation of applicants' invention, it should be noted that applicants have written Bragg gratings into both core only multimode sulfide fiber ($As_{40}S_{55}Se_5$, 300-$\mu$m diameter) and a core-clad multimode sulfide fiber ($As_{40}S_{55}Se_5$ 200 $\mu$m core diameter, $As_{40}S_{60}$ 300 $\mu$m clad diameter). Thus, it should be understood that the fibers in which gratings can be written in this invention can be core only (a single composition of glass) or core-clad (two concentric compositions of glass, where the core index is higher than the cladding index.)

Figure 1:
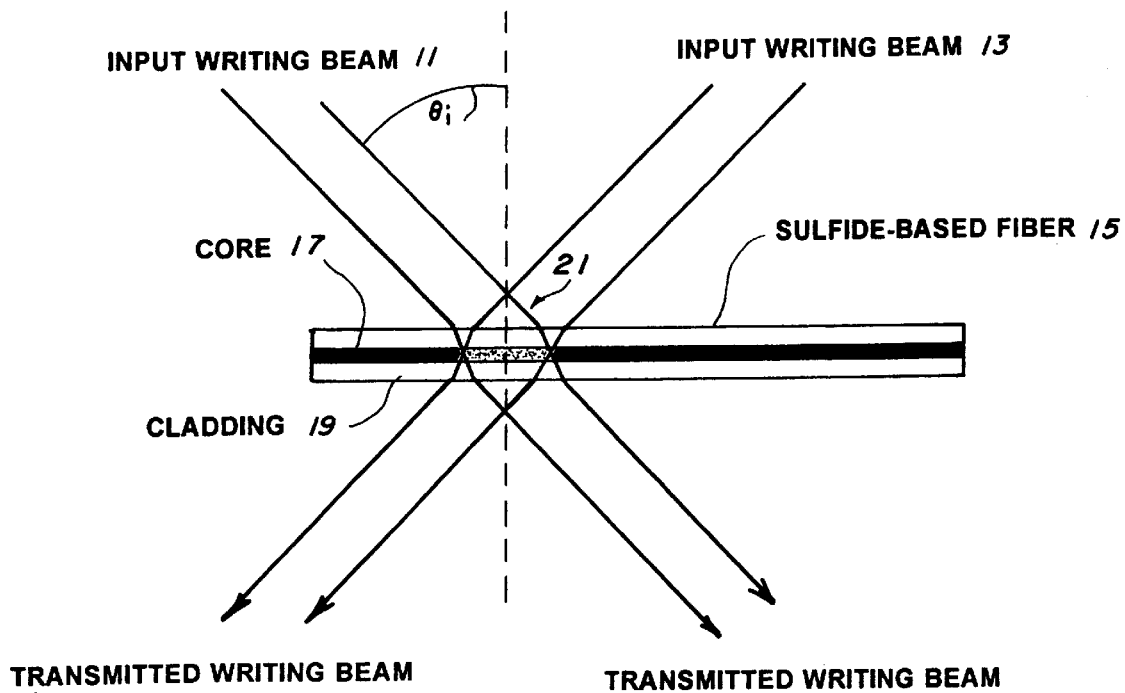
FIG. 1 illustrates a simplified schematic diagram of a reflective fiber Bragg grating side-written into a sulfide-based chalcogenide infrared optical fiber and further indicates a method for side-writing the grating into the sulfide-based chalcogenide infrared optical fiber.

Referring now to the drawings, FIG. 1 illustrates a simplified schematic diagram of a reflective fiber Bragg grating side-written into a sulfide-based chalcogenide infrared optical fiber and further indicates a method for side-writing the grating into the sulfide-based chalcogenide infrared optical fiber.

As shown in FIG. 1, two exemplary laser beams at the same writing wavelength are used as input "writing" beams 11 and 13. These two writing beams 11 and 13 are crossed at some angle $\theta_i$ in space.

A chalcogenide- or chalcohalide- based glass (FIG. 2) infrared transmitting optical fiber, such as a sulfide-based fiber 15 having a core 17 and a cladding 19, is placed at the intersection point where the two writing beams 11 and 13 cross in space such that where the beams 11 and 13 cross coincides with the fiber 15 itself—the fiber core 17 and cladding 19. The crossed beams 11 and 13 form an interference pattern or intensity grating 21 along the axis of the fiber 15 itself with period $\Lambda = \lambda_W/(2 \sin \theta)$, where $\lambda_W$ is the writing wavelength and $\theta_i$ is the half-angle between the writing beams 11 and 13. The writing wavelength $\lambda_W$ is in the range of 0.5 $\mu$m to 1.5 $\mu$m. This wavelength is chosen to have an absorption length in the particular glass composition of the fiber 15 such that it is weakly absorbed in the glass. Weakly absorbed is defined as an absorption of between 0.1 and 10 $cm^{-1}$. For example, this would correspond to a wavelength in the range of 0.5 $\mu$m–0.8 $\mu$m in the $As_{40}S_{60}$ glass composition, and a wavelength range of 0.8 $\mu$m–1.4 $\mu$m in the $Ge_{33}As_{12}Se_{55}$ composition.

When the two crossed beams 11 and 13 are left on the fiber 15 for a predetermined length of time, such as an exemplary three or four minutes, the interference pattern 21 in the fiber 15 produces an index change in the glass, causing a change $\Delta n$ in the index of refraction n at lower photon energies. The range of $\Delta n$ induced by the crossed beams 11 and 13 at $\lambda_W$ is between 0 and 0.2. It should be noted at this time that the typical range of writing fluences at $\lambda_W$ is between 0.1 and 100 $W/cm^2$, and will be incident from 0–1000 minutes. Any writing fluence/temporal duration of writing sufficient to write a $\Delta n$ consistent with the above specified 0 to 0.2 range of an $\Delta n$ induced by the crossed beams 11 and 13 at $\lambda_W$ is intended to be covered by the claimed invention.

The grating produced by the two writing beams 11 and 13 forms a Bragg reflector at the vacuum wavelength $\lambda_B$ for light launched down the core of the fiber at $\lambda_B = 2n\Lambda$. The "photonic band gap" energy, $\Delta v_B$, which corresponds to the full-width of the reflectance between the first two zeros of the reflectivity, is $\Delta v_B/v_B = \Delta n/n$ where $v_B = c/\lambda_B$ and c is the speed of light.

So the change in the index of refraction will go higher and lower periodically in space along the length of the fiber 15, essentially producing a multi-stack mirror (not shown). The wavelength at which the mirror reflects depends on the period of that grating which can be changed by changing the angle $\theta_i$ between the beams 11 and 13. (To be discussed in regard to FIG. 3.)

When it is desired to determine the wavelength at which reflecting occurs, an infrared beam can be injected into the core 17 of the fiber 15 and the writing wavelength of the beams 11 and 13 can be changed until a wavelength is reflected from the fiber 15. That reflected wavelength is called the Bragg wavelength or the Bragg reflection wavelength $\lambda_B$. The Bragg reflection wavelength $\lambda_B$ is in the infrared region from 1.5 $\mu$m–15 $\mu$m. The necessary writing angles and wavelengths to achieve a desired Bragg reflection wavelength are shown and discussed in relation to FIG. 3.

The mechanism for writing a photo-induced index change is based on rearranging the local bonding structure of the intrinsic atoms of the chalcogenide-based or chalcohalide-based glass used in the infrared optical fibers. No dopants are used or required for the photoinduced index change.

The fiber materials covered by this application are all chalcogenide and chalcohalide glasses where an index change can be photoinduced with a writing wavelength $\lambda_W$ using the mechanism described in the previous paragraph. Components of exemplary fiber material glass compositions of chalcogenide-based infrared optical fibers are shown in FIG. 2A, while components of exemplary fiber glass compositions of chalcohalide-based infrared optical fibers are shown in FIG. 2B.

Figure 2A:
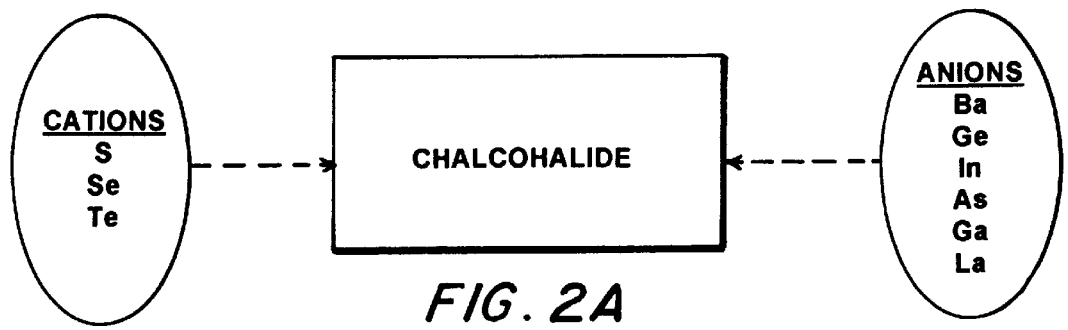
FIG. 2 illustrates exemplary fiber material compositions of chalcogenide and chalcohalide based infrared optical fibers.

As indicated in FIG. 2A, the chalcogenide glass compositions include any glass composed of at least one of the anions sulfur (S), selenium (Se) and tellurium (Te) and at least one suitable cation, including but not limited to barium (Ba), germanium (Ge), indium (In), arsenic (As), gallium (Ga), or lanthanum (La) in binary, ternary, quaternary, etc. mixtures. Example chalcogenide glass compositions include $As_{40}S_{60}$, $As_{40}S_{55}Se_5$, and $Ge_{33}As_{12}Se_{55}$.

Figure 2B:
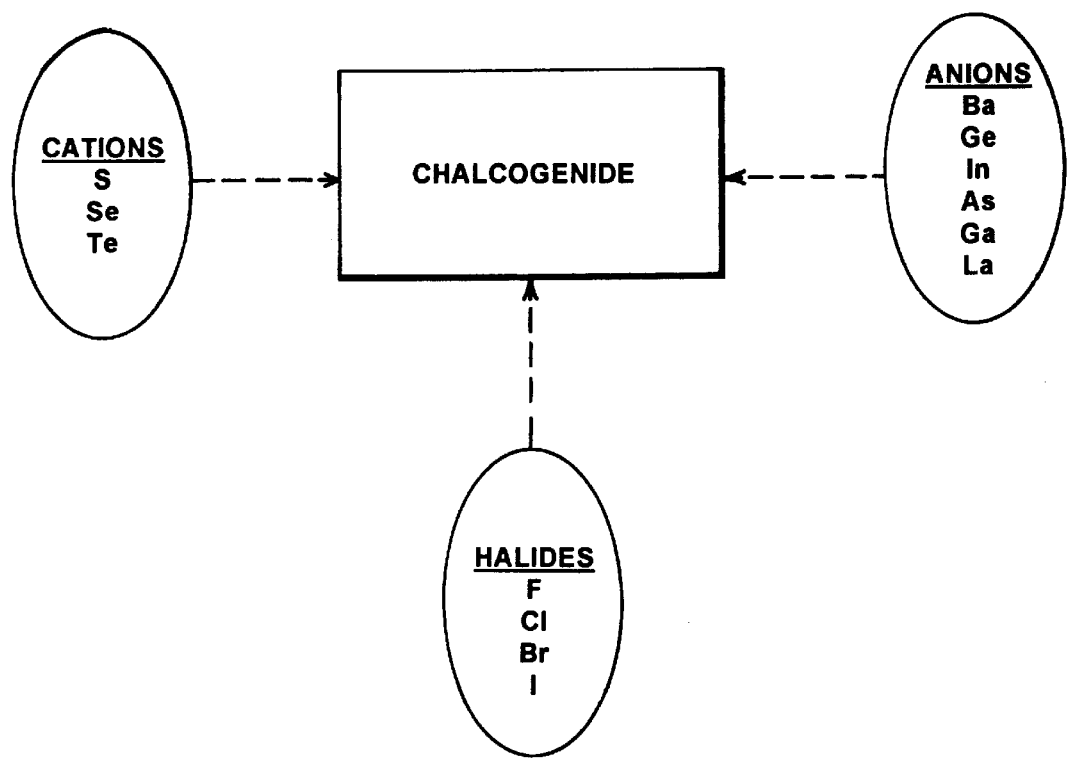

As indicated in FIG. 2B, the chalcohalide glass compositions include any glass composed of at least one of each of the aforementioned cations and anions, plus at least one of the halides (but less than a total of 50 weight percent) of chlorine (Cl), fluorine (F), bromine (Br) and iodine (I).

It is intended that all compositions of the chalcogenide and chalcohalide glasses that form a stable glass and exhibit photoinduced index changes are included in the claimed invention.

Figure 3:
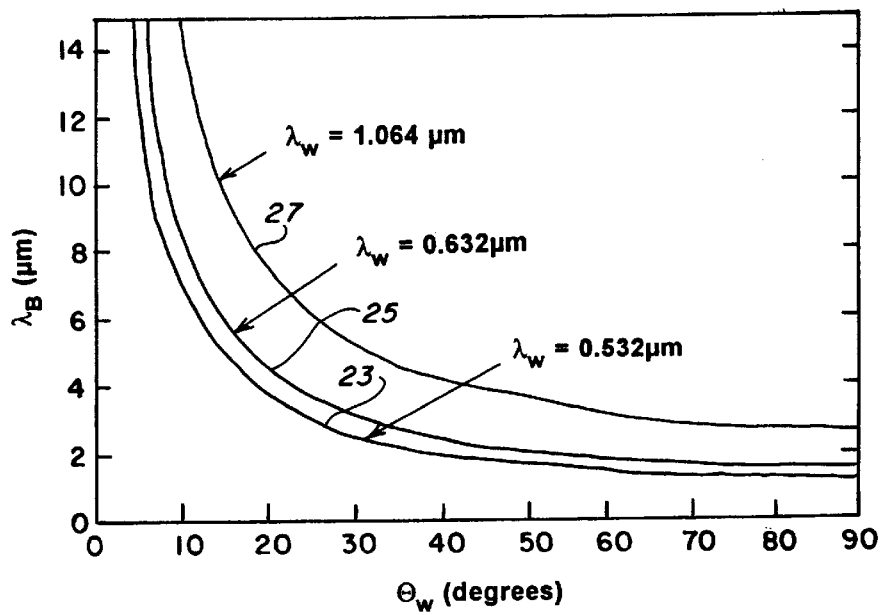
FIG. 3 illustrates the Bragg reflection wavelength $\lambda_B$ verses the writing angle $\theta_W$ for three typical writing wavelengths $\lambda_W$.

Referring now to FIG. 3, FIG. 3 illustrates the Bragg reflection wavelength $\lambda_B$ verses the writing angle $\theta_W$ for three typical writing wavelengths $\lambda_W$. The angle of $\theta_W$ on the X-axis of FIG. 3 corresponds to the angle $\theta_i$ between the writing beams 11 and 13 that are incident upon the fiber 15 in FIG. 1. FIG. 3 indicates that upon choosing a given $\theta_W$ angle along the X-axis for one of the three typical writing wavelengths shown in FIG. 3, an associated Bragg reflection wavelength will be indicated on the Y-axis. For example, if a writing wavelength of about 532 nm, which corresponds to a frequency doubled Nd:YAG laser, were selected and an $\theta_W$ angle of 30° were chosen, FIG. 3 would indicate that a Bragg reflection wavelength of about 2.4 microns would result. So as indicated in the curve of FIG. 3, as the $\theta_W$ angle gets smaller as the left-hand side of the curve is approached down to 0°, the Bragg wavelength increases to longer and longer wavelengths $\lambda_B$. Thus, if it were desired to write a Bragg grating at, for example, 10 microns, it can be seen that the 10 on the Y-axis would correspond to a $\theta_W$ angle of about 10°. So if 10° were put on the angle shown in FIG. 3, FIG. 3 would correspond to FIG. 1.

Three different curves are shown in FIG. 3. The three different curves correspond to three different writing wavelengths which would be crossed in FIG. 1. Pairs of beams would be derived from the same laser. The lowest curve 23 corresponds to a wavelength of 532 nm from an exemplary frequency doubled Nd:YAG. The center curve 25 corresponds to a 632 nm wavelength from a helium-neon laser. And the upper curve 27 corresponds to a 1.064 $\mu$m wavelength from a Nd:YAG laser. From FIG. 3, it can be readily seen that the angle necessary to write a given reflectivity gets wider with longer wavelengths. A different writing wavelength may be required to write in infrared fibers having different compositions in order to make sure that the radiation from a laser is completely absorbed in the glass of the infrared transmitting fiber.

Figure 4:
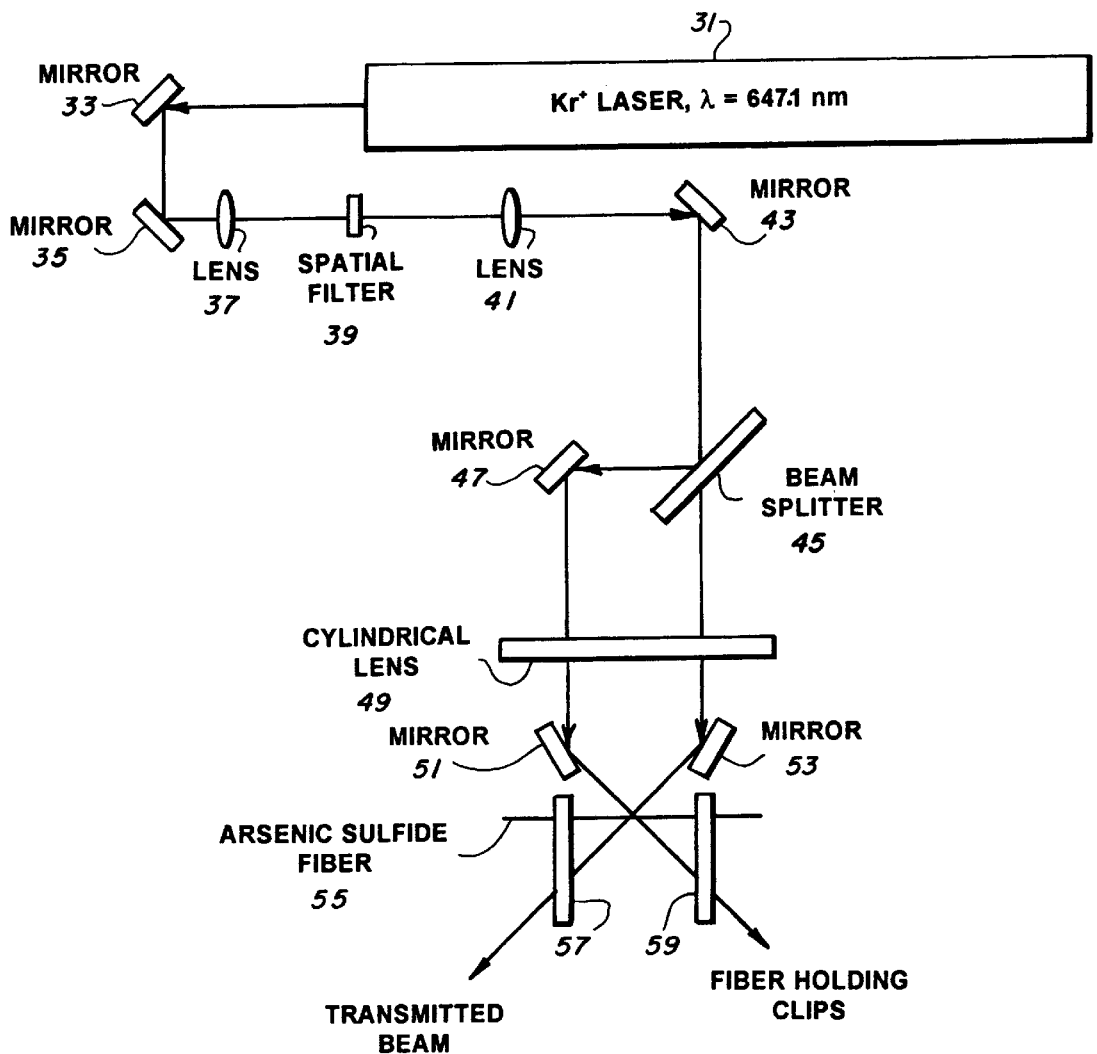
FIG. 4 illustrates a schematic diagram of an experiment which demonstrated the side-writing of a fiber Bragg grating in an arsenic sulfide-based chalcogenide infrared optical fiber.

Referring now to FIG. 4, a schematic diagram of an experiment which demonstrated the side-writing of a fiber Bragg grating in an arsenic sulfide-based chalcogenide infrared optical fiber is shown. As shown in FIG. 4, a krypton ion laser 31 transmits a 40 mW CW beam at a wavelength $\lambda$=647.1 nm (or 0.6471 $\mu$m). The transmitted beam is sequentially reflected by two mirrors 33 and 35 so that the beam can be focused down to a small point by a lens 37.

The focused beam from the lens 37 is passed through a spatial filter 39 which basically is just a pinhole (not shown) in a piece of metal to clean up the beam. The pinhole can be about an exemplary 100 microns in diameter, depending on the size of the lens 37 being used. Any irregularities in the shape of the beam or distortions caused by, for example, dust will not focus to a nice fine point of light that will readily pass through the pinhole in the spatial filter 39 but will be blocked by the spatial filter 39. The only light that comes through the pinhole in the spatial filter 39 is basically a perfect beam which starts to diverge as it exits the pinhole. The diverging beam that is exiting the pinhole in the spatial filter 39 is collimated by a lens 41. The lenses 37 and 41 and the spatial filter 39 operate together to make the beam at the output of the lens 41 round and clean-shaped.

The collimated beam from the lens 41 is reflected by a mirror 43 to a beamsplitter 45 in the part of the experiment that actually writes the grating. The beam splitter 45 reflects half of the power or 20 mW to another mirror 47 which, in turn, reflects the light to a cylindrical lens 49. The beam splitter 45 passes the other half of the power or 20 mW therethrough to the cylindrical lens 49. Thus, essentially two parallel 20 mW light beams are applied to the cylindrical lens 49. The cylindrical lens 49 begins to focus each of the two beams in only one direction down to a relatively long and thin line.

As the beams are focusing, they are redirected toward each other by flat mirrors 51 and 53 to cross at an angle $\theta$. The beams look like lines at the point where they cross in space at the focus. It is at that point in space where an arsenic sulfide fiber 55 is placed and held in position by fiber holding clips 57 and 59 while at least one Bragg grating is being written into the fiber 55. In a useful device, a single mode fiber would preferably be used with the core size of the fiber being very small, such as an exemplary 10 microns in diameter.

The two beams cross at an angle $\theta$ along the core of the arsenic sulfide fiber 55 so that a Bragg grating can be written into into the fiber 55.

The arsenic sulfide fiber transmits most of the 0.6471 $\mu$m light which is incident on the side of the fiber 55. This light emerges as from a very strong cylindrical lens in two opposing "arc" shaped patterns. Each beam also has a visible reflection from the surface of the fiber. To get the alignment correct, these directions of the "arc" shaped reflections off the fiber are matched with the complementary input beam to assure that the beams overlap in the fiber core.

It was determined that about 3 minutes of illumination with 20 mW in each writing beam (for a 3 mm long grating) was sufficient to saturate the amplitude of the photoinduced index change. The fact that a large amplitude Bragg grating was written in the fiber was verified by blocking one of the writing beams after the beams were incident for several minutes. As one beam is blocked, a large portion of the other beam is diffracted into the blocked-beam's direction which was clearly visible to the naked eye with normal room lighting present.

Advantages and New Features of the Invention

There are two new features of the invention. The first key new feature is that $\lambda_B$ is now in the IR region of 1.5–15 $\mu$m. The second new key feature is that the mechanism of making $\Delta n$ does not depend on any dopant(s) to be present in the glass material. Also, when light is sent down the core of a single-mode sulfide fiber, it will be reflected by this Bragg grating. Unlike silica fiber Bragg gratings, however, the index-change amplitude of these gratings is larger by two orders of magnitude, allowing the possibility of constructing highly reflective, wide band structures.

Also, since the writing wavelength is around 650 nm, the writing could be done in principle with commercially available pulsed or continuous-wave laser diodes, eliminating the need for an expensive and unwieldy excimer or krypton laser.

Alternatives

The writing process depends only on the total number of photoinduced carriers which subsequently recombine in the illuminated area. This suggests that the fibers may be written with short pulses which inject the same total number of carriers. This will allow very fast writing of a single grating, similar to the process already in use with silica fibers. See "Fiber Bragg Reflectors Prepared By A Single Excimer Pulse", C. G. Askins et al., *Optics Letters,* Vol. 17, No. 11, pp. 833–835, (Jun. 1, 1992).

In addition, fiber Bragg gratings can be written via the same method and using the same physical process in other fiber compositions. This photodarkening effect occurrs in any chalcogenide or chalcohalide based fibers, including fiber compositions containing the chalcogens sulfur, tellurium, and selenium, and mixtures of the aforementioned chalcogens with halides such as fluorine and chlorine.

Fiber Bragg gratings can also be written in chalcogenide fibers which are doped with rare-earths such as erbium and praesodymium, which will allow mirror integration in laser and laser amplifier devices based on these materials.

Therefore, what has been described in a preferred embodiment of the invention is a method, and the resultant device, for forming at least one reflective fiber Bragg grating in the interior of an infrared transmitting glass fiber, such as a chalcogenide or chalcohalide-based infrared optical fiber, by side illuminating the fiber with two same-wavelength, laser writing beams which intersect at some angle in the fiber to form an intensity grating by way of interference along the length of the fiber, maintaining the infrared transmitting glass fiber at the intersection of the two writing beams to produce a reflective Bragg grating in the core and cladding of the glass fiber, and repeating this operation for each reflective fiber Bragg grating that is desired.

It should therefore readily be understood that many modifications and variations of the present invention are possible within the purview of the claimed invention. For example, the laser 31 could be replaced with a different laser to develop a different writing wavelength, such as a Nd:YAG laser which emits at 1064 nm, a doubled Nd:YAG laser which emits at 532 nm, or preferably with a helium neon laser which emits at 632 nm. The output power of the laser such be limited to, for example about 40 mW to avoid burning the fiber 55 that a Bragg grating is being written into. Similarly, the fiber 55 could be replaced with any chalcogenide or chalcohalide infrared transmitting fiber having a composition selected according to the discussion in relation FIGS. 2A and 2B. Furthermore, it should be noted that the optical section of FIG. 4, which is shown being comprised of the exemplary combination of mirrors 33, 35 and 43, lenses 37 and 41 and the spatial filter 39, could be simplified and/or replaced with any other combination of optical components to direct and split the output of the laser 31 into two substantially equal power beams before applying those beams to the cylindrical lens 49. For example. the laser beam from the laser 31 could be directly applied to the beam splitter 45. It is therefore to be understood that, within the scope of the appended claims, the invention may be practiced otherwise than as specifically described.

What is claimed and desired to be secured by Letters Patent of the United States is:

1. A method of fabricating at least two reflective Bragg gratings in the interior of an infrared transmitting glass fiber, said method comprising the steps of:
    (a) producing first and second writing beam lines at the same wavelength;
    (b) orienting the first and second writing beam lines in parallel with respect to each other;
    (c) crossing the first and second writing beam lines at a preselected angle with respect to each other to form an interference pattern at the intersection of the first and second writing beam lines;
    (d) positioning a first part of the infrared transmitting glass fiber at the intersection of the first and second writing beam lines so that the interference pattern occurs along a first portion of the length of the infrared transmitting glass fiber;
    (e) maintaining the first part of the infrared transmitting glass fiber at the intersection of the first and second writing beam lines for a time sufficient to produce a first Bragg grating in the core and of the infrared transmitting glass fiber;
    (f) positioning a second part of the infrared transmitting glass fiber at the intersection of the first and second writing beam lines so that the interference pattern occurs along a second portion of the length of the infrared transmitting glass fiber; and
    (g) maintaining the second part of the infrared transmitting glass fiber at the intersection of the first and second writing beam lines for a time sufficient to produce a second Bragg grating in the core and cladding of the infrared transmitting glass fiber;
    wherein the wavelength of the first and second writing beams is within the range from about 0.5 $\mu$m to about 1.5 $\mu$m in order to produce a Bragg reflection wavelength in the range between 1.5 $\mu$m to about 15 $\mu$m.

2. The optical fiber made according to claim 1.

3. A method of forming an optical grating in an optical fiber, said grating being constituted by variations in the index of refraction in said optical fiber, comprising:
    providing said optical fiber, said fiber comprising optical material that is either chalcogenide or chalcohalide;
    producing a pair of writing beams of the same preselected frequency, wherein said preselected frequency is within the range of frequencies corresponding to wavelengths in the range of 0.5 $\mu$m to 1.5 $\mu$m;
    directing said beams to cross one another and placing said optical fiber at the intersection point where said beams cross one another effectively to form an interference pattern with one another within said optical material, thereby obtaining a Bragg reflection wavelength in the range between 1.5 $\mu$m to 15 $\mu$m; and
    maintaining said interference pattern sufficiently long to permit said pattern to form said grating by forming variations in the index of refraction within said material corresponding to said pattern.

4. The optical fiber made according to claim 3.

5. An apparatus for forming an optical grating in an optical fiber, said grating being constituted by variations in the index of refraction in said optical fiber, comprising:
    an optical material that is either chalcogenide or chalcohalide;
    an optical source effective to produce a pair of writing beams of the same preselected frequency, wherein said preselected frequency is within the range of frequencies corresponding to wavelengths between about 0.5 to 1.5 $\mu$m, thereby obtaining a Bragg reflection wavelength in the range between 1.5 $\mu$m to 15 $\mu$m; and
    said source is disposed to cause said beams to cross one another effective to form an interference pattern with one another within said material by placing said optical fiber at the intersection point where said beams cross one another;
    wherein said source and said means for directing are adapted to cooperate effectively to maintain said interference pattern sufficiently long to permit said pattern to form said grating by causing variations in the index of refraction within said material corresponding to said pattern.

6. A method of fabricating a reflective Bragg grating in the interior of an infrared transmitting glass fiber, said method comprising the steps of:
    producing first and second writing beams at the same wavelength;
    orienting the first and second writing beams in parallel with respect to each other;
    crossing the first and second writing beams at a preselected angle with respect to each other to form an interference pattern at the intersection of the first and second writing beams;
    positioning the infrared transmitting glass fiber at the intersection of the first and second writing beams to that the interference pattern occurs along a portion of the length of the infrared transmitting glass fiber; and maintaining the infrared transmitting glass fiber at the intersection of the first and second writing beams for a time sufficient to produce a Bragg grating in the core and cladding of the infrared transmitting glass fiber;

wherein the infrared transmitting glass fiber is selected from the group consisting of any chalcogenide-based fiber and any chalcohalide-based fiber; and wherein said first and second writing beams has a wavelength within the range from about 0.5 $\mu$m to about 1.5 $\mu$m, thereby obtaining a Bragg reflection wavelength in the range between 1.5 $\mu$m to 15 $\mu$m.

7. The method of claim 6 wherein said producing step includes the steps of:

generating a collimated optical beam; and splitting the optical beam into the first and second writing beam lines.

8. The method of claim 7 wherein the chalcogenide- and chalcohalide-based fibers include fiber compositions selected from the group consisting of glass compositions containing the chalcogens: sulfur, tellurium, and selenium, and mixtures thereof with halides.

9. The method of claim 8 wherein the halide is selected from the group consisting of fluorine, chlorine, bromine, iodine, and mixtures thereof.

10. The method of claim 6 wherein the infrared transmitting fiber is an infrared transmitting sulfide-based fiber.

11. The method of claim 6 wherein the interfering first and second writing beam lines have a wavelength of light corresponding to a spectral absorption in the glass fiber wherein incident laser photons induce a permanent alteration in the glass fiber structure, resulting in a permanent index change in the glass fiber.

12. The method of claim 6 wherein said positioning step includes the step of:

side-illuminating the infrared transmitting glass fiber with the first and second writing beam lines so that they intersect at the preselected angle in the infrared transmitting glass fiber to form an intensity Bragg grating by way of interference along the portion of the length of the infrared transmitting glass fiber.

13. The method of claim 6 wherein said maintaining step includes the step of:

side-writing a Bragg grating in the interior of the infrared transmitting glass fiber.

14. The method of claim 6 wherein the crossing step includes the step of:

crossing the first and second writing beam lines so that the intersection of the first and second writing beam lines coincides with the core of the infrared transmitting glass fiber.

15. The method of claim 6 wherein the infrared transmitting glass fiber is a chalcogenide fiber doped with rare-earths selected from the lanthanide group and combinations thereof.

16. The method of claim 6 wherein each of the first and second writing beam lines contains about 20 mW of power and the maintenance of the infrared transmitting glass fiber at the intersection of the first and second writing beam lines for about 3 minutes of illumination is sufficient to saturate the amplitude of the photoinduced index change.

17. The method of claim 6 wherein the writing power densities at the writing wavelength are between about 0.1 and about 100 W/cm$^2$ and will be incident on the infrared transmitting glass fiber for a time duration between about 0.1 and about 1000 minutes.

* * * * *